US011827530B2

United States Patent
Itai et al.

(10) Patent No.: US 11,827,530 B2
(45) Date of Patent: Nov. 28, 2023

(54) IRRIGATION LIQUID FILTRATION SYSTEM

(71) Applicant: Netafim, Ltd., Tel Aviv (IL)

(72) Inventors: Tamir Itai, Kibbutz Maagan Michael (IL); Lorne Belford, Kibbutz Magal (IL)

(73) Assignee: Netafim, Ltd., Tel Aviv (IL)

( * ) Notice: Subject to any disclaimer, the term of this patent is extended or adjusted under 35 U.S.C. 154(b) by 0 days.

(21) Appl. No.: 17/213,806

(22) Filed: Mar. 26, 2021

(65) Prior Publication Data

US 2021/0214240 A1    Jul. 15, 2021

Related U.S. Application Data

(63) Continuation-in-part of application No. PCT/IB2019/057663, filed on Sep. 11, 2019.

(60) Provisional application No. 62/736,745, filed on Sep. 26, 2018.

(51) Int. Cl.
*C02F 1/00* (2023.01)

(52) U.S. Cl.
CPC ........ *C02F 1/001* (2013.01); *C02F 2201/002* (2013.01); *C02F 2301/02* (2013.01); *C02F 2301/043* (2013.01)

(58) Field of Classification Search
CPC .............. C02F 1/001; C02F 2201/002; C02F 2301/02; C02F 2301/043
USPC ........................................................ 210/767
See application file for complete search history.

(56) References Cited

U.S. PATENT DOCUMENTS

| | | | | |
|---|---|---|---|---|
| 2,407,228 A | * | 9/1946 | Forsyth .................. | B01J 47/022 210/277 |
| 4,399,034 A | * | 8/1983 | Moller .................... | B01D 24/06 210/268 |
| 4,458,059 A | | 7/1984 | Fields | |
| 4,720,347 A | * | 1/1988 | Berne ................ | B01D 24/4631 210/189 |
| 5,472,609 A | * | 12/1995 | Field ........................ | B01J 49/60 210/279 |
| 5,584,998 A | * | 12/1996 | Teter .................... | B01D 24/105 210/405 |
| 6,059,967 A | * | 5/2000 | Field .................. | B01D 24/4631 210/275 |
| 6,110,389 A | * | 8/2000 | Horowitz ............. | B01D 24/165 210/150 |
| 6,319,413 B1 | * | 11/2001 | Xia ...................... | B01D 29/114 210/678 |

(Continued)

FOREIGN PATENT DOCUMENTS

| CN | 202028245 | 11/2011 |
|---|---|---|
| CN | 204798914 | 11/2015 |

OTHER PUBLICATIONS

International Search Report dated Dec. 10, 2019, in counterpart International (PCT) Application No. PCT/IB2019/057663.

(Continued)

*Primary Examiner* — Latosha Hines
(74) *Attorney, Agent, or Firm* — Womble Bond Dickinson (US) LLP

(57) ABSTRACT

A media filter includes an inlet and a diffuser located axially below the inlet for distributing liquid entering the filter via the inlet over the media in the filter. The diffuser including one or more members extending generally orthogonal to the axis of the filter.

22 Claims, 9 Drawing Sheets

(56) References Cited

U.S. PATENT DOCUMENTS

| | | | | |
|---|---|---|---|---|
| 8,152,998 B2* | 4/2012 | Xia | ............... | B01D 24/4689 |
| | | | | 210/678 |
| 8,349,183 B2* | 1/2013 | Field | ............... | B01J 47/14 |
| | | | | 210/291 |
| 9,827,513 B2* | 11/2017 | Ekholm | ............... | F16L 55/07 |
| 11,413,558 B1* | 8/2022 | Das | ............... | C02F 1/004 |
| 2007/0163939 A1* | 7/2007 | Field | ............... | B01D 24/14 |
| | | | | 210/292 |
| 2009/0294356 A1* | 12/2009 | Beggs | ............... | C02F 3/04 |
| | | | | 210/275 |
| 2016/0038856 A1* | 2/2016 | Ekholm | ............... | B01D 35/00 |
| | | | | 137/15.04 |
| 2018/0133624 A1* | 5/2018 | Malone | ............... | B01D 24/4636 |

OTHER PUBLICATIONS

Written Opinion dated Dec. 10, 2019, in counterpart International (PCT) Application No. PCT/IB2019/057663.

\* cited by examiner

IRRIGATION LIQUID FILTRATION SYSTEM

RELATED APPLICATIONS

This is a Bypass Continuation-in-Part of International Patent Application No. PCT/IB2019/057663, filed 11 Sep. 2019 and published as WO 2020/065431A1 on 2 Apr. 2020. Priority is claimed to U.S. Provisional Patent Application No. 62/736,745 filed 26 Sep. 2018. The contents of the aforementioned applications are incorporated by reference in their entirety.

TECHNICAL FIELD

Embodiments of the invention relate to a liquid filtration system, in particular a media filtration system.

BACKGROUND

Water filtration systems used in agricultural applications may include a metal or plastic tank with an inlet and an outlet and a bed of media (such as sand, peat, or the like) located in-between. Particles within the liquid may be physically removed by the media as the liquid flows therethrough.

U.S. Pat. No. 4,458,059 for example describes a liquid filtration system that includes a tank, a liquid inlet tube and liquid outlet tube spaced apart. A porous filter is placed in the tank between the liquid inlet and liquid outlet that has a plurality of modules, each comprising a self-supporting body of granules cemented together and the upstream portion of the filter body contains a layer of fine aggregate while the downstream portion a layer of larger aggregate.

In some cases, the liquid flow impinging upon the bed of media within the filter may urge the media to substantially move, possibly forming piles within the bed that accumulate—which may overtime reduce effectiveness of filtering.

FIG. 1 schematically illustrates a filter 1 where such formation of a pile of media 2 here at a central area of the bed is formed resulting in reduced thickness 'd' of media above an outgoing section 3 of the filter's outlet at locations where media was removed to form the pile—such as at peripheral regions of the media. Such reduced thickness 'd' of the media may harm filtering effectiveness.

Reducing and/or limiting formation of such piles within the bed of media used in such filters may improve efficiency of filtering.

SUMMARY

The following embodiments and aspects thereof are described and illustrated in conjunction with systems, tools and methods which are meant to be exemplary and illustrative, not limiting in scope.

In an embodiment there is provided a media filter having an axis and comprising an inlet and a diffuser located axially below the inlet for distributing liquid entering the filter via the inlet over the media in the filter, the diffuser comprising a circular base generally orthogonal to the filter's axis, the base comprising a central core and a plurality of wings extending radially away from the core forming spacings in-between adjacent wings, wherein each spacing expands as it extends away from the core.

In another embodiment there is provided a media filter having an axis and comprising an inlet and a diffuser located axially below the inlet for distributing liquid entering the filter via the inlet over the media in the filter, the diffuser comprising upper and lower impinging members and liquid entering the filter forming upper and lower flow patterns when impinging, respectively, against the upper and lower impinging members, wherein at least portions of said upper and lower flow patterns merge to form combined flow patterns that extend generally sideways away from the axis.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figure 1:
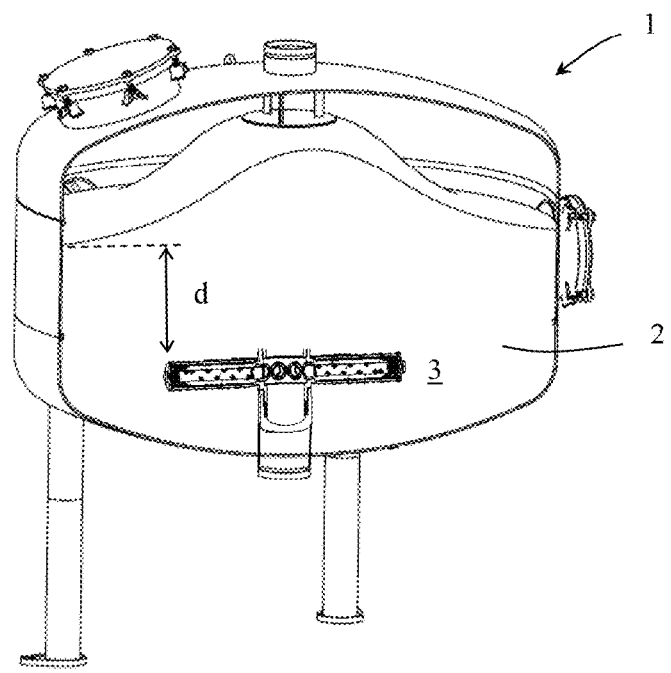
FIG. 1 schematically shows a possible filter where a media bed within the filter may possibly substantially pile up at a central location of the bed after performing filtration procedure for a certain period of time.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Figure 2:
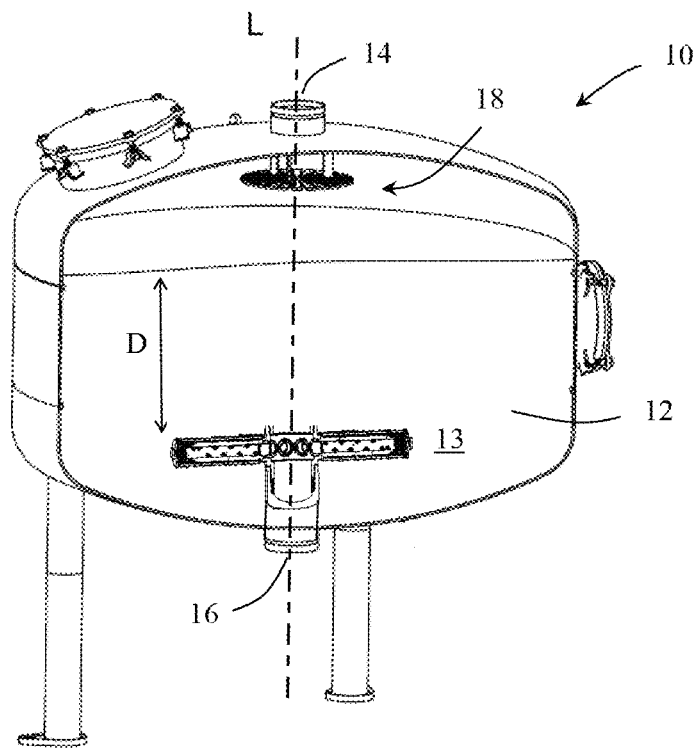
FIG. 2 schematically shows an embodiment of a media filter of the invention where piling up of a bed of media within the filter may be substantially reduced.
Figure 4:
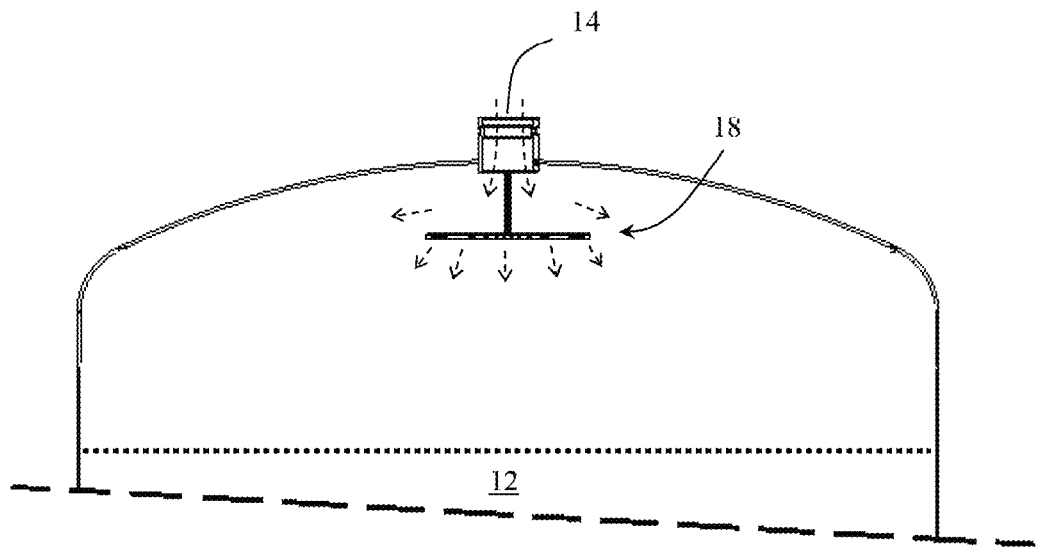
FIG. 4 schematically shows a partial cross-sectional view of the filter of FIG. 3 revealing an embodiment of a diffuser possibly used within the filter.

Attention is first drawn to FIG. 2 illustrating a possible view of a media filter 10 according to an embodiment of the present invention. Filter 10 includes a vertically oriented longitudinal filter axis L, an inlet 14, an outlet 16 and a bed of media 12 (e.g. sand, peat or the like) located in between. As seen in FIG. 2, the inlet 14 is at a higher elevation along the filter axis L than the outlet 16. As seen in FIG. 4, the inlet is positioned above the upper surface of the bed of media 12, along the filter axis L. As also seen in FIG. 4, the diffuser 18 is positioned above an upper surface of the bed of media 12. Filter 10 in addition includes an outgoing section 13 of the outlet 16 for leading filtered liquid out of the filter; and filter 10 is also shown here including an embodiment of a diffuser 18 suitable for tailored distribution of liquid entering the filter over the bed of media.

Filter 10 prior to a scheduled filtering procedure may be arranged to have a thickness 'D' of media about outgoing section 13 and the tailored distribution of liquid by diffuser 18 may be arranged to substantially maintain the media's thickness closer to 'D' than to the thinner thickness 'd' illustrated in FIG. 1 with respect to prior media filters (where dimension 'd' is illustrated as existing in FIG. 1 at least at peripheral regions of the media bed).

Liquid (marked by dashed-lines) entering filter 10 via inlet 14 flows via diffuser 18 to interact with media 12 and exit the filter via outlet 16. Interaction of incoming liquid with diffuser 18 permits at least some of the liquid to pass through the diffuser in a general downward direction towards the media and generally sideways (see arrows in dashed-lines illustrated in FIG. 4). The filter during use is typically filled with liquid also above the media 12, and the incoming liquid flow (accordingly indicated by the arrows in dashed-lines in FIG. 4) bears against existing liquid within the filter as it flows into the filter.

Particles within the liquid may be physically removed by the media bed as the liquid flows therethrough. Filter 10 may be used in a variety of applications such as in an irrigation system at an upstream portion of the system in order to remove particles from the liquid that may otherwise clog fluid passages within the system.

Figure 3:
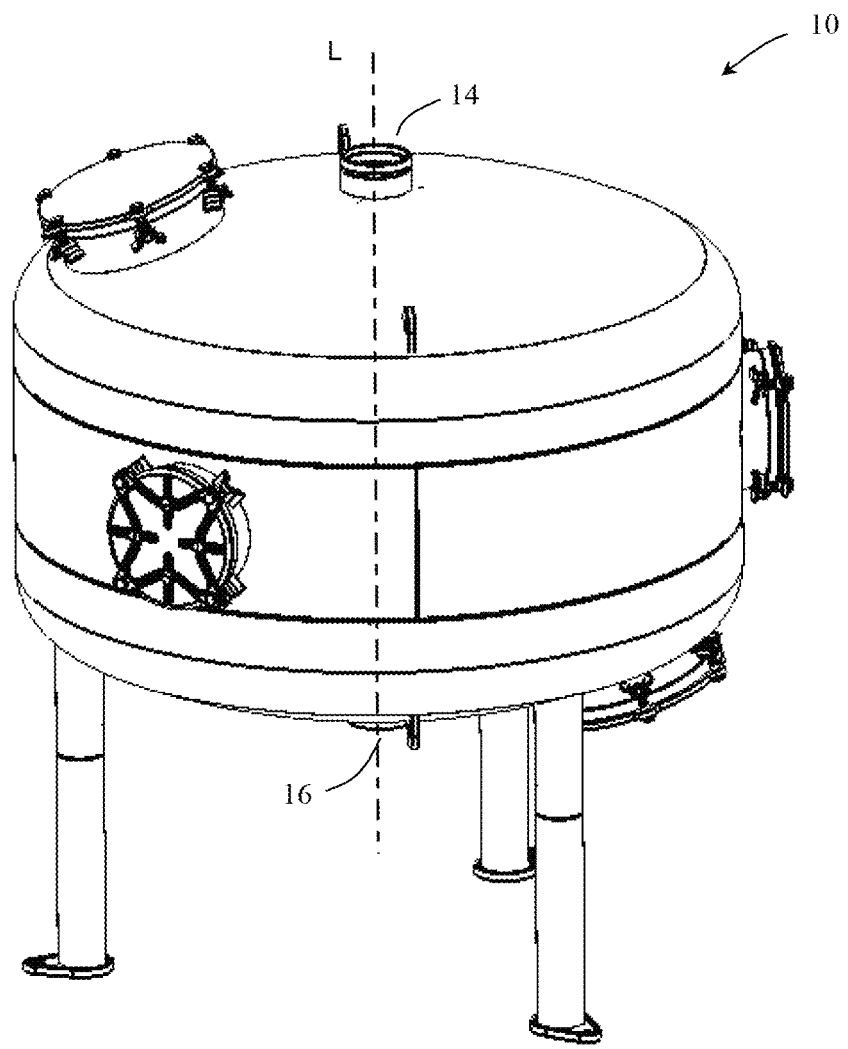
FIG. 3 schematically shows a perspective view of an embodiment of a media filter of the invention.

Attention is drawn to FIG. 3 for a perspective view of a filter 10 generally similar to the filter previously shown and discussed. FIG. 4 schematically illustrates a cross sectional view of FIG. 3 revealing an embodiment of a diffuser 18 located within the filter immediately after the filter's inlet 14 in order to distribute liquid entering the filter over the filter's bed of media 12 located within the filter and beneath the diffuser.

Figure 5A:
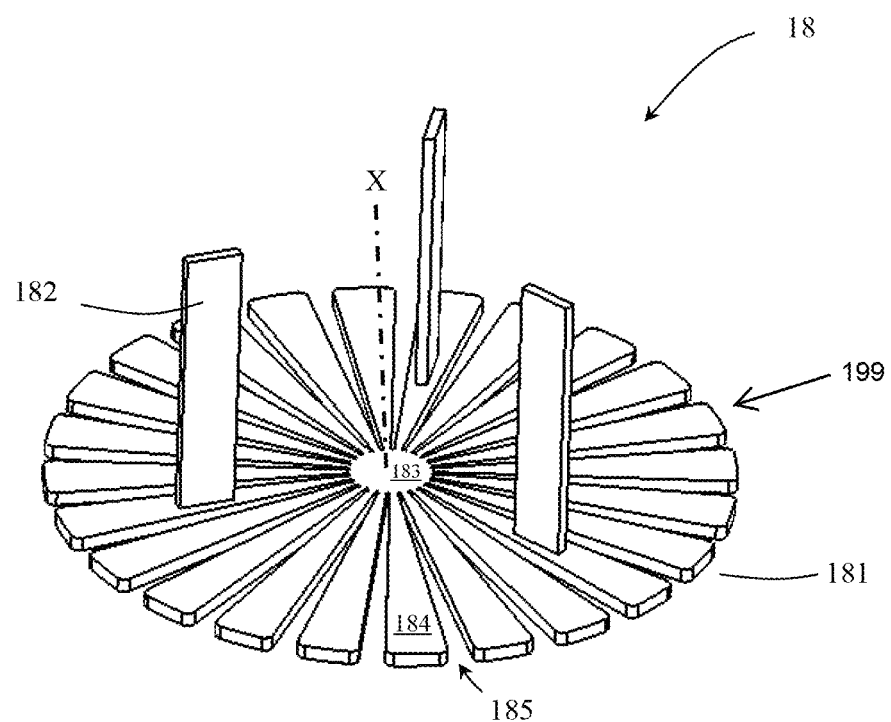
FIGS. 5A to 5C schematically show various views of embodiments of a diffuser generally similar e.g. to that in FIG. 4.
Figure 5B:
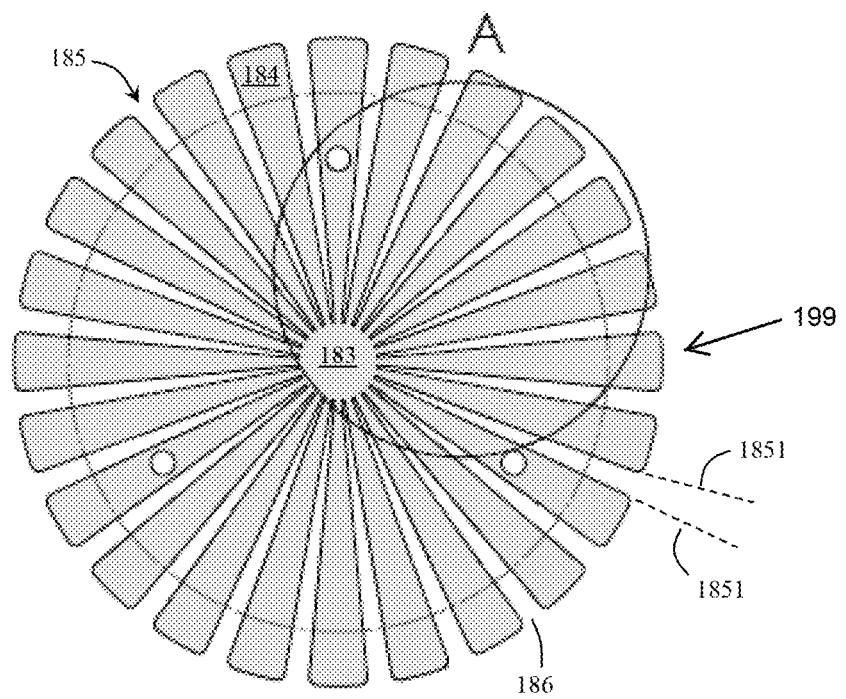
Figure 5C:
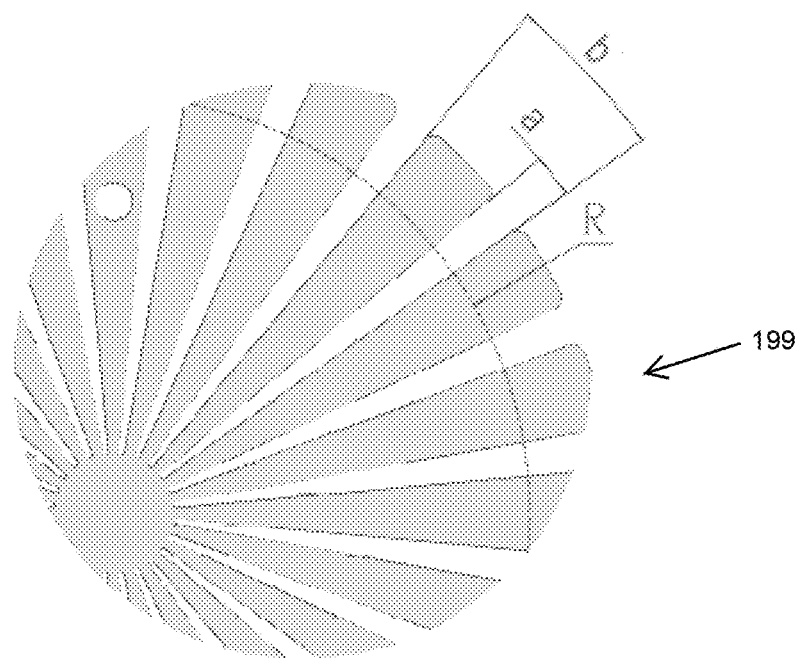

FIGS. 5A to 5C schematically illustrate an embodiment of a diffuser 18 possibly suitable for use as the diffuser of the filters seen in FIGS. 2 to 4. Diffuser 18 in this example includes a generally circular base 181 and legs 182 that extend up from the base and attach each at an upper end to a portion of the filter generally adjacent inlet 14.

Diffuser 18 has an axis X that extends generally upright in relation to the base 181, and the legs 182 of the diffuser may be arranged to extend in an axial direction and be symmetrically distributed about axis X. Base 181 has a central core 183 and axis X may be arranged to extend through a center of the core. The base 181 of the diffuser 18 is provided with a plurality of apertures configured to permit liquid to pass through the base 181. Base 181 in addition includes wings 184 that extend radially away from the core possibly in a symmetrical distribution about axis X.

Each wing 184 as shown may be spaced apart in a peripheral direction about axis X from its adjacent wings by a spacing 185. The circumferential width of each spacing 185 in the example seen in FIGS. 5A-5C expands (i.e., increases) as it extends radially away from core 183. Such expansion may be embodied in this example by defining each spacing 185 as being bound between two edges 1851 that diverge away from each other in a direction away from core 183. In the embodiment see in FIGS. 5A-5C, the spacings 184 constitute the aforementioned apertures configured to permit liquid to pass through the base 181.

Each spacing 185 in addition in the example seen in FIGS. 5A-5C may be arranged to include an open end 186 at its radial outer side most distant from the core. Such open ends 186 may encourage grit/particles included within incoming liquid that meets the diffuser, to be flushed sideways out of the diffuser and thus substantially not clog the spacings 185.

Figure 6A:
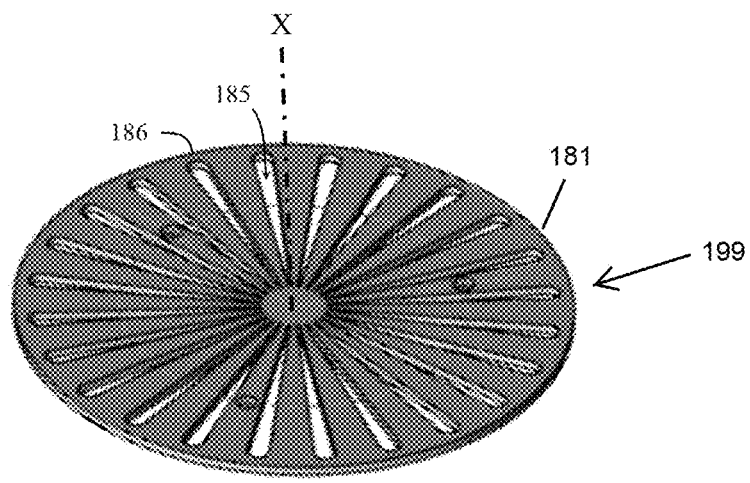
FIGS. 6A to 6C schematically show various views of other embodiments of a diffuser of the invention.

Attention is drawn to FIG. 6A illustrating an embodiment of a diffuser generally similar to that in FIGS. 5A-5C but here including apertures which comprise a closed end 186 at the radial outer side of each spacing 185 most distant from the core.

Figure 6B:
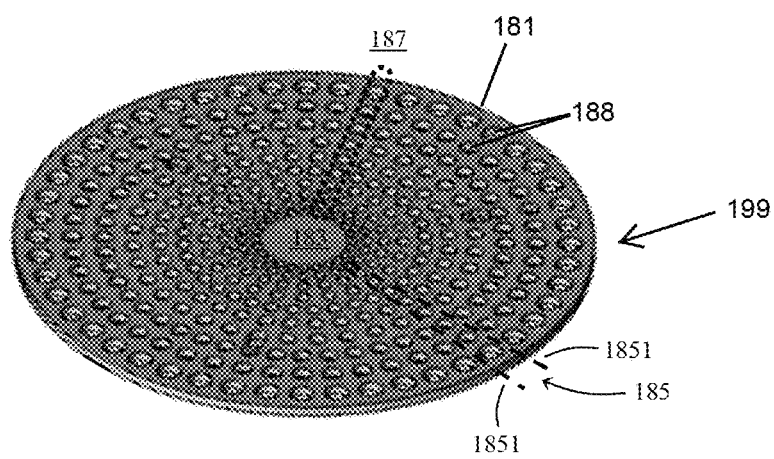

Attention is drawn to FIG. 6B illustrating an embodiment of a diffuser in which the apertures are arranged in arrays 187 of individual openings 188 formed in the base 18. Each array 187 may be a linear array extending radially from the core to the periphery 199 of the base. Openings 188 extending along a radial direction away from the core may be arranged to increase in size and thus each array of openings may be defined as expanding as it extends away from the core. Such expansion may be embodied in this example by defining each array 187 as being bound between two edges 1851 that diverge away from each other in a direction away from the core.

Figure 6C:
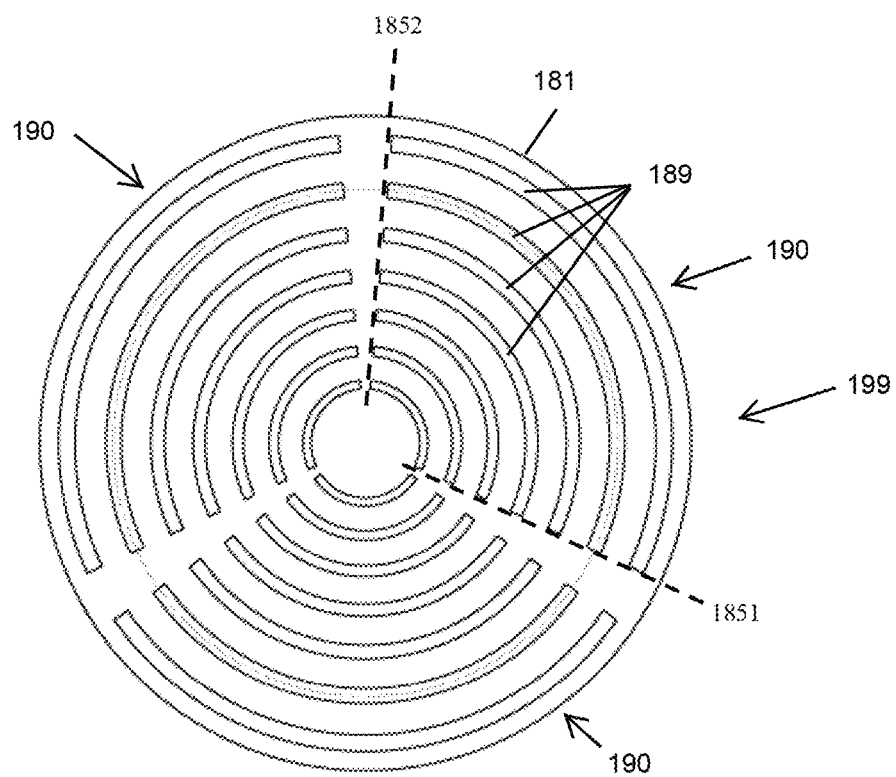

Attention is drawn to FIG. 6C illustrating yet another embodiment of apertures, here in form of circular arc segments 189 concentrically stacked one after the other in a radial outward direction. Edges 1851, 1852 bounding several arc segments 189 form groups 190 of such apertures that expand in a radial outward direction.

Such increase in expansion of each aperture as it extends away from the diffuser's core 183 has been found to reduce likelihood of piles being formed in media beds used in such filters. In the embodiment seen in FIG. 6C, three circumferentially spaced apart groups 190 of concentrically stacked circular arc segments 189 are provided. It is understood, however, that other numbers of group sets may be provided instead. Also in the embodiment seen in FIG. 6C, each such group 190 is seen to have 7 such stacked circular arc segments 189. Again, it is understood that other numbers of circular arc segments may be provided in each group 190.

In all of the embodiments seen in FIGS. 5A-C and 6A-6C, the diffuser base 181 is configured such that a first portion of liquid passes through the apertures, while a second portion of liquid passes over the base towards the periphery 190, without passing through the apertures.

Figure 7:
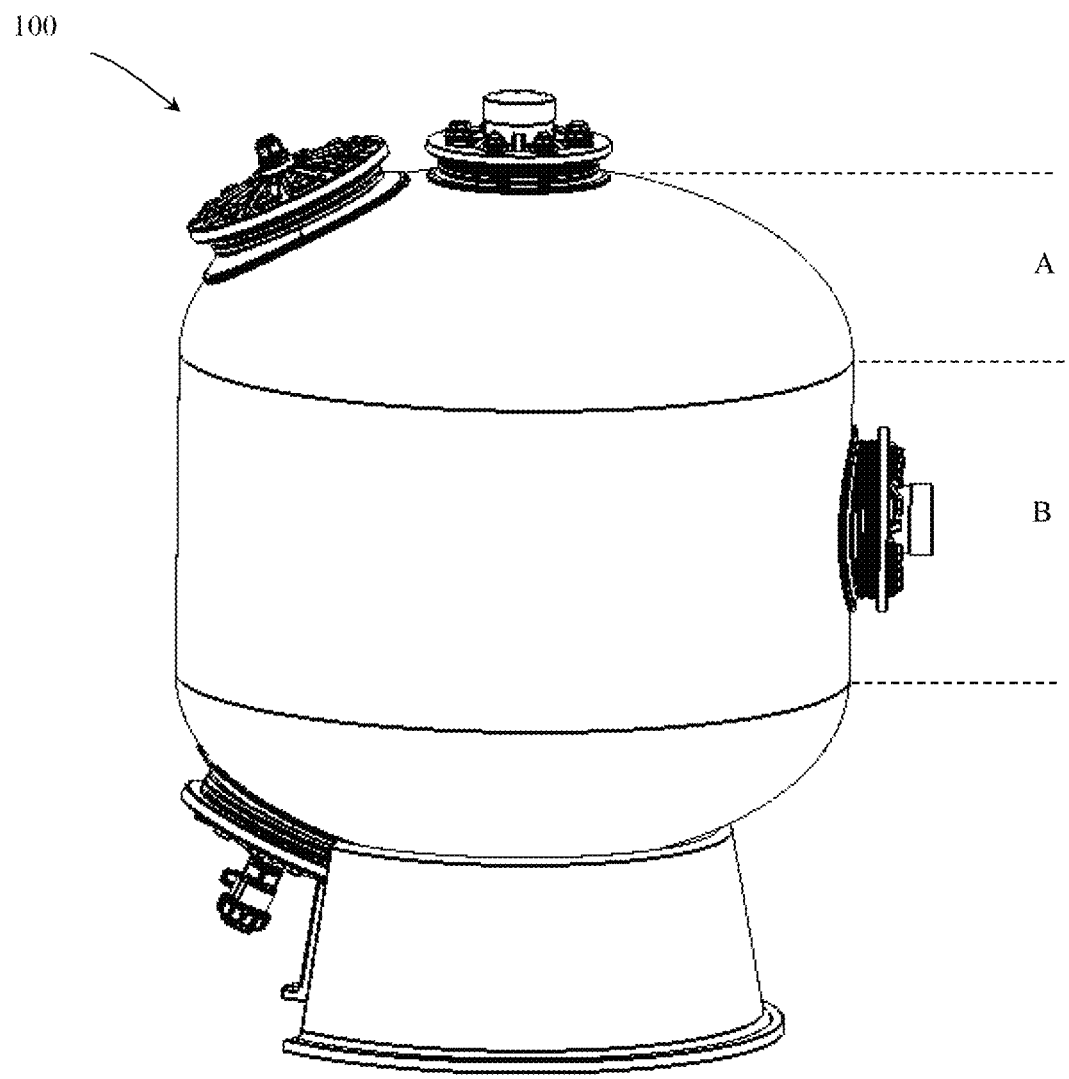
FIG. 7 schematically shows a perspective view of another embodiment of a media filter of the invention.
Figure 8:
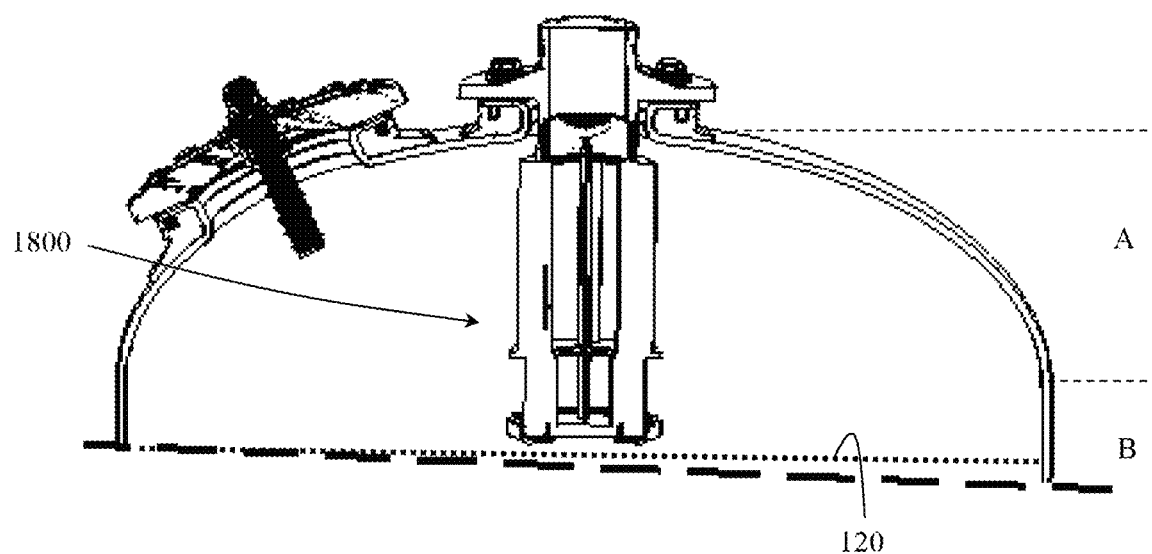
FIG. 8 schematically shows a partial cross-sectional view of the filter of FIG. 7 revealing an embodiment of a diffuser possibly used in the filter.

Attention is drawn to FIG. 7 illustrating an embodiment of a filter 100 that includes an inlet and outlet and a bed of media in between. With attention additionally drawn to FIG. 8—filter 100 in this embodiment may be seen as including a diffuser 1800 of different structure to diffuser 18. Filter 100 is seen including an outer housing with an upper spherical section A and a lower generally cylindrical section B located axially below section A.

Preferably, operative impinging members of diffuser 1800 that are tailored to divert incoming liquid flow sideways, may be arranged to be substantially positioned axially within section B of the filter. Such preference may be in order to reduce likelihood of liquid flow directed sideways by diffuser 1800 from being diverted downwards by curved surfaces of the filter's spherical section A. Such downward liquid flow patterns if formed may encourage build up of piles in the filter's media resulting in reduced filtering efficiency.

Filter 100, similarly to as described with respect to filter 10, may include an outgoing section (as 13 in FIG. 2) at its outlet, and during use filter 100 may typically filled with liquid also above its media so that incoming liquid flow entering via the filter's inlet may bear against existing liquid within the filter as it flows into the filter.

Diffuser 1800 extends along an axis Y (generally parallel or coinciding with the filter's axis L) and includes axially spaced apart lower and upper impinging members 1810, 1820 that are here connected by axially extending legs 1840. Lower impinging member 1810 includes a bottom plate 1811 generally orthogonal to axis Y and a peripheral rim 1812 that extends up from a periphery of bottom plate 1811 and is formed about axis Y. Upper impinging member 1820 includes a peripheral disk-like barrier 1821 that extends along a plane generally perpendicular to axis Y and a central aperture 1822 formed through barrier 1821.

Diffuser 1800 includes at its upper side a coupler 1830 arranged to couple to an inner upper side of filter 100. The coupler 18310 extends above a top plate 1829 of the diffuser 1800. Coupler 1830 is arranged to couple to the filter about a location where the inlet of the filter is located and coupler 1830 includes a through-going passage 1831 providing a path for liquid entering the filter via its inlet to interact with diffuser 1800. Coupler 1830 in the example shown includes a thread 1832 on its periphery for coupling to the filter.

Figure 9A:
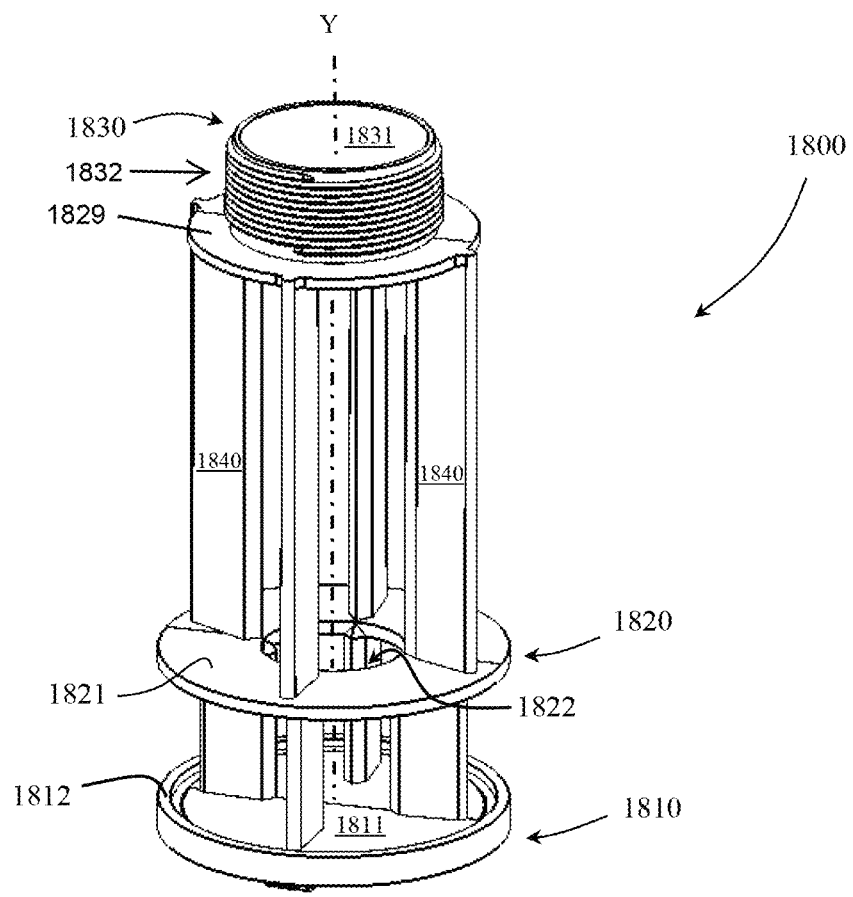
FIGS. 9A and 9B schematically show various views of embodiments of a diffuser generally similar e.g. to that in FIG. 8.
Figure 9B:
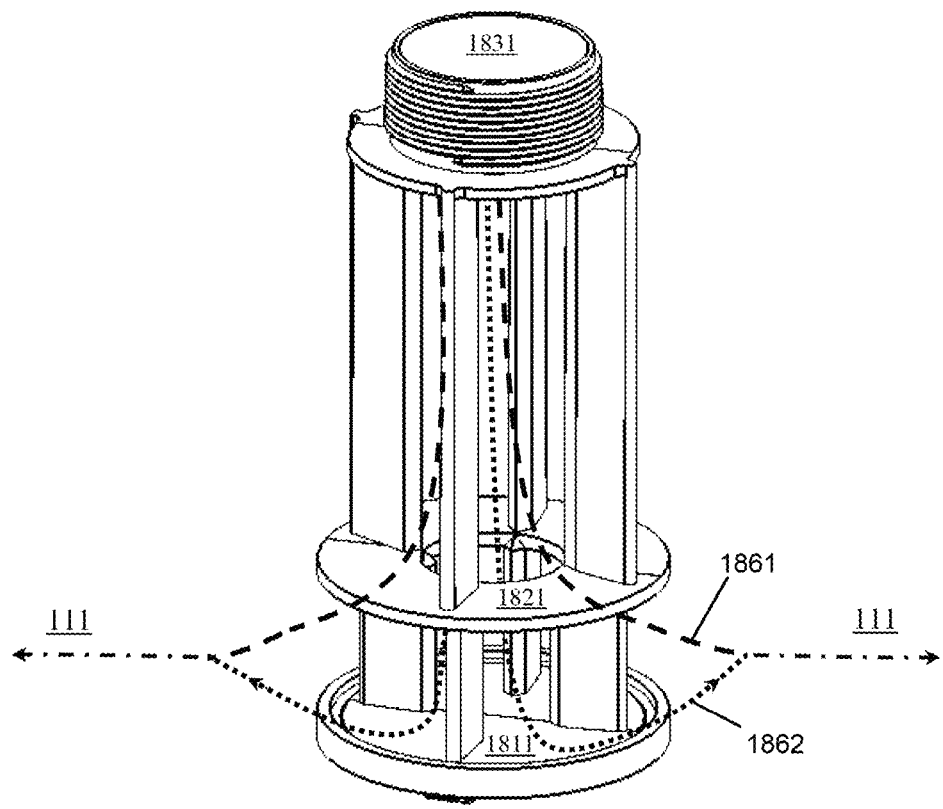

Attention is drawn to FIG. 9B illustrating liquid paths formed due to interactions of liquid flowing towards diffuser 1800 via passage 1831. The 'dashed' lines illustrate first liquid flow patterns formed due to interaction of liquid with the disk-like plate 1821 of the upper impinging member 1820. These 'dashed' flow patterns extend generally sideways away from axis Y and possibly slightly axially downwards.

The 'dotted' lines illustrate a general second liquid flow pattern formed due to interaction of liquid with the lower impinging member 1810. Liquid flowing towards the lower impinging member bears against bottom plate 1811 and as it is urged sideways away from axis Y, hits peripheral rim 1812 to assume liquid flow patterns extending generally sideways and slightly axially upwards. Thus a first portion 1861 of liquid entering the diffuser's through-going passage 1831 is directed radially outward above the disk-like plate 1821 of the upper impinging member 1820, while a second portion 1862 of liquid entering the diffuser's through-going passage 1831 is directed radially outward below the disk-like plate 1821 of the upper impinging member 1820.

These 'dotted' flow patterns of the second liquid portion 1862 when encountering the 'dashed' flow patterns of the first liquid portion 1861 form combined flow patterns 111 (marked here by the dash-dotted lines) that extend generally sideways. Such generally sideways directed flow patterns 111 (extending away from axis Y) are less likely to assume flow routes extending generally downwards, inter alia, due to being axially located generally within the cylindrical section B of the filter's housing and therefore avoiding interaction with surfaces that would otherwise deflect such flow patterns downwards.

Such sideways directed flow patterns 111 form a so-called "sweeping" action the generally maintains the upper face of the bed of material 120 (see material 120 indicated in FIG. 8), which is preferably located immediately beneath diffuser 1800, generally planar and substantially devoid of any formed piles in the bed. Thus, such distribution of sideways directed liquid flow patterns 111 have been found to reduce likelihood of piles being formed in media beds used in such filters.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Furthermore, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

What is claimed is:

1. An irrigation media filter having a vertically oriented longitudinal filter axis (L), and comprising:
    a filter housing having a bed of media therein;
    an inlet provided on a top portion of the filter housing:
    an outlet provided on a bottom portion of the filter housing, and in fluid communication with the inlet, the inlet being at a higher elevation along the filter axis (L) than the outlet; and
    a diffuser positioned above an upper surface of the bed of media, the diffuser being located axially below the inlet for distributing liquid entering the filter via the inlet over media in the filter, the diffuser having a diffuser axis and comprising:
        a circular base generally orthogonal to the filter axis, the base having a central core and a periphery; and
        at least one aperture formed in base and extending radially away from the core towards the periphery, each aperture configured to allow liquid introduced into the filter via the inlet to pass through the base, wherein:
        a circumferential width of each aperture increases in size, as said each aperture extends in a radial direction away from the core and towards the periphery; and
        a first portion of liquid entering at the inlet passes axially through the at least one aperture before exiting the diffuser, and a second portion of liquid entering at the inlet passes over the base towards the periphery and exits the diffuser without first passing through said at least one aperture.

2. The irrigation media filter according to claim 1, wherein the base comprises:
    a plurality of apertures;
    a plurality of wings extending radially away from the core to the periphery; and
    a plurality of spacings alternating with the plurality of wings, each spacing extending in said radial direction, the plurality of spacings constituting the plurality of apertures; wherein:

said second portion of liquid entering at the inlet passes over the wings towards the periphery before exiting the diffuser in a generally radial direction, without having first passed through the apertures.

3. The irrigation media filter of claim 2, wherein each spacing is open at an end thereof which is most distant from the core and adjacent wings are not connected to one another at the periphery.

4. The irrigation media filter of claim 2, wherein each spacing is closed at an end thereof most distant from the core and adjacent wings are connected to one another at the periphery.

5. The irrigation media filter of claim 1, comprising:
a plurality of apertures arranged as radially extending arrays of individual openings formed in the base; and
within an array, the circumferential widths of successive openings increase in said radial direction.

6. The irrigation media filter of claim 5, wherein each opening in the array has a circular shape.

7. The irrigation media filter of claim 5, wherein each opening in the array has an arcuate shape.

8. An irrigation media filter having a vertically oriented longitudinal filter axis (L), and comprising:
an outer housing;
an inlet provided on a top portion of the filter housing;
an outlet provided on a bottom portion of the filter housing and in fluid communication with the inlet, the inlet being at a higher elevation along the filter axis (L) than the outlet; and
a diffuser having a diffuser axis (Y) and located axially below the inlet for distributing liquid entering the filter via the inlet over media in the filter, the diffuser comprising:
axially spaced apart top and bottom plates;
a coupler extending above the top plate and coupled to an inner side of the filter, the coupler having a through-going passage configured to permit liquid entering the inlet to pass therethrough;
an upper impinging member axially located between the top and bottom plates, the upper impinging member having an aperture and configured to allow a first portion of said liquid to radially leave the diffuser and form an upper flow pattern, and a second portion of said liquid to pass through the aperture and continue below the upper impinging member;
a lower impinging member axially located below the upper impinging member and spaced apart therefrom, the lower impinging member configured to direct the second portion of liquid to radially leave the diffuse and form a second flow pattern, such that at least portions of said upper and lower flow patterns merge to form combined flow patterns that extend generally sideways away from the diffuser axis (Y).

9. The irrigation media filter of claim 8, wherein the upper impinging member is disk shaped and the lower impinging member comprises a circular plate and a raised rim located at a periphery of the plate.

10. The irrigation media filter of claim 8, wherein each of the upper and lower impinging members extends generally orthogonal to the filter axis (L).

11. The irrigation media filter of claim 8, wherein the outer housing has a generally cylindrical housing portion formed about the upper and lower impinging members.

12. The irrigation media filter of claim 8, further comprising axially extending legs between the top plate and the upper impinging member, and between the upper impinging member and the lower impinging member.

13. The media filter of claim 8, wherein the coupler is threaded.

14. A method of filtering water for irrigation purposes comprising:
providing an irrigation media filter in accordance with claim 1, the media filter having media in a lower portion of the media filter;
providing a pre-existing amount of liquid within the filter that covers both the media and the diffuser, and
urging into the filter, an axially incoming liquid flow that bears against existing liquid within the filter while generally interacting with the diffuser to flow towards the media both (a) through at least some of the apertures of the diffuser and also (b) generally sideways in directions transverse to the diffuser axis without passing through said apertures.

15. The method of claim 14, comprising providing a media filter in which the base comprises:
a plurality of apertures;
a plurality of wings extending radially away from the core to the periphery; and
a plurality of spacings alternating with the plurality of wings, each spacing extending in said radial direction, the plurality of spacings constituting the plurality of apertures; wherein:
said second portion of liquid entering at the inlet passes over the wings towards the periphery before exiting the diffuser in a generally radial direction, without having first passed through the apertures.

16. The method of claim 15, comprising providing a media filter in which each spacing is open at an end thereof which is most distant from the core and adjacent wings are not connected to one another at the periphery.

17. The method of claim 15, comprising providing a media filter in which each spacing is closed at an end thereof most distant from the core and adjacent wings are connected to one another at the periphery.

18. The method of claim 14, comprising providing a media filter in which:
the plurality of apertures are arranged as radially extending arrays of individual openings formed in the base; and
within an array, the circumferential widths of successive openings increase in said radial direction.

19. The method of claim 18, comprising providing a media filter in which each opening in the array has a circular shape.

20. The method of claim 18, comprising providing a media filter in which each opening in the array has a circular shape.

21. The irrigation media filter of claim 1, wherein the inlet is positioned above an upper surface of the media in the filter.

22. The irrigation media filter of claim 8, wherein the inlet is positioned above an upper surface of the media in the filter.

* * * * *